US005761696A

United States Patent [19]
Giordano et al.

[11] Patent Number: 5,761,696
[45] Date of Patent: Jun. 2, 1998

[54] PARALLEL DATABASE SERVING MECHANISM FOR A SINGLE-LEVEL-STORE COMPUTER SYSTEM

[75] Inventors: Thomas Paul Giordano; Thomas Owen McKinley, both of Rochester, Minn.; Mukesh Rathor, Austin, Tex.; David Rolland Welsh, Byron, Minn.

[73] Assignee: International Business Machines Corporation, Armonk, N.Y.

[21] Appl. No.: 631,713

[22] Filed: Apr. 2, 1996

[51] Int. Cl.[6] .............................. G06F 9/32; G06F 17/30
[52] U.S. Cl. ........................ 711/6; 707/1; 707/2; 707/3; 711/129; 711/153; 395/200.33; 395/200.45
[58] Field of Search ........................ 395/601, 602, 395/603, 604, 448, 289, 200.33, 200.45; 707/1, 2, 3; 711/153, 129, 173, 6

[56] References Cited

U.S. PATENT DOCUMENTS

| 4,912,636 | 3/1990 | Magar et al. | 364/200 |
|---|---|---|---|
| 5,046,002 | 9/1991 | Takashi et al. | 364/200 |
| 5,123,106 | 6/1992 | Otsuki et al. | 395/725 |
| 5,129,077 | 7/1992 | Hillis | 395/500 |
| 5,493,728 | 2/1996 | Solton et al. | 395/250 |
| 5,542,087 | 7/1996 | Neimat et al. | 395/600 |
| 5,590,319 | 12/1996 | Cohen et al. | 395/604 |
| 5,630,124 | 5/1997 | Coyle, Jr. et al. | 395/614 |

FOREIGN PATENT DOCUMENTS 281239  9/1988  Japan.

*Primary Examiner*—Thomas G. Black
*Assistant Examiner*—Jean R. Homere
*Attorney, Agent, or Firm*—Steven W. Roth

[57] ABSTRACT

The present invention involves a database administrator that is comprised of a plurality of database managers and a plurality of database servers. The database managers act as an interface between the database servers and client programs and the database servers act as an interface between the database managers and the database itself. The client programs, database managers, and database servers all execute within a single-level-store environment, which allows them to communicate with one another without incurring the expense of inter-address space communication and/or the expense associated with the cross-address space mapping of query results.

7 Claims, 8 Drawing Sheets

PARALLEL DATABASE SERVING MECHANISM FOR A SINGLE-LEVEL-STORE COMPUTER SYSTEM

FIELD OF THE INVENTION

This invention relates to the data processing field. More specifically, this invention relates to database serving in a single address space computer system.

BACKGROUND OF THE INVENTION

The development of the EDVAC computer system of 1948 is often cited as the beginning of the computer era. Since that time, computer systems have evolved into extremely complicated devices. To be sure, today's computers are much more sophisticated than early systems such as the EDVAC. Fundamentally speaking, though, the most basic requirements levied upon computer systems have not changed. Now, as in the past, a computer system's job is to access, manipulate, and store information. This fact is true regardless of the type or vintage of computer system. Accordingly, computer system designers are constantly striving to improve the way in which a computer system can deal with information.

When information is stored on a computer system, it is often placed into a database (sometimes called a databank). The computer system typically has one or more computer programs, often called database managers, that are responsible for helping other computer programs access, manipulate, and save the database's information. This patent involves improvements to the way in which database managers provide access to information stored in computer system databases.

Current database managers suffer from three primary shortcomings. First, communicating a request to a database manager involves the overhead of what we will term inter-address space communication. Second, current computer system designs involve either a single database manager or a fixed number of database managers, which limits the overall performance of the computer system in certain situations. Third, current database manager design involves the expense of what we will term cross-address space mapping of the requested information. (Inter-address space communication and cross-address space mapping are explained in greater detail in the Description of the Preferred Embodiment section of this patent.)

Without an improved database manager that does not suffer from inter-address space communication, a limited number of database servers, and cross-address space mapping, the overall benefits provided by database managers will continue to be limited.

SUMMARY OF THE INVENTION

The present invention involves a database administrator that is comprised of a plurality of database managers and a plurality of database servers. The database managers act as an interface between the database servers and client programs and the database servers act as an interface between the database managers and the database itself. The client programs, database managers, and database servers all execute within a single-level-store environment, which allows them to communicate with one another without incurring the expense of inter-address space communication and/or the expense associated with the cross-address space mapping of query results.

DESCRIPTION OF THE PREFERRED EMBODIMENT

Overview

Figure 1:
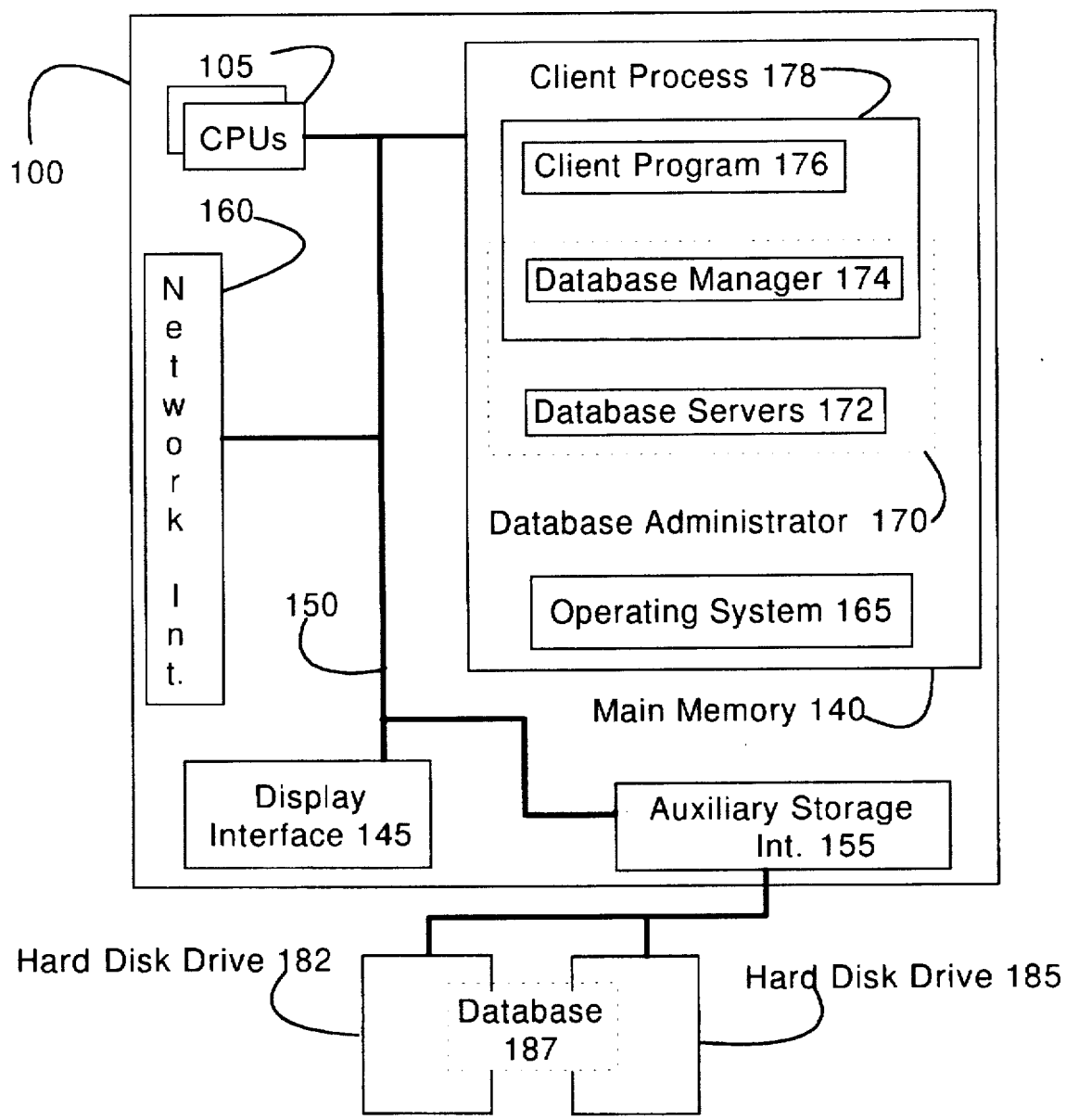
FIG. 1 is a block diagram of the computer system of the present invention.

For those readers who are not experts in computer system memory organization, a brief overview of this topic is presented here. Those readers who are familiar with computer system memory organization should proceed to the Detailed Design section of this patent. The Detailed Design section immediately follows this Overview section.

Programs, Processes, and Tasks

To understand computer system memory organization in a way that allows for a full appreciation of benefits provided by the present invention, it is important to first define a few key terms. "Programs" are written by a computer system user in a chosen programming language. The programs are then converted into instructions that can be executed by the computer system's central processing unit. When a program is first started, it executes under the control of what is called a process (sometimes processes are referred to as tasks). Stated another way, a process is the unit of execution for a program. After the program is executing, it can call or invoke one or more other programs. When a program finishes executing, its process terminates.

Virtual Addressing

As is well known, information (called data) is stored in the computer system's memory. Computer system memory is generally categorized into two types, "main memory" and "auxiliary storage." Computer system information is located using what are called "memory addresses." Information stored in main memory is located via addresses known as real addresses, while information stored in auxiliary storage is located in a way that is specific to the particular type of auxiliary storage device. In general, main memory is used by the computer system to store information that is of current interest to the programs executing on the computer system's processor. Auxiliary storage, on the other hand, is used to store information that is not currently needed by the computer system's programs.

Over the years, computer system designers have settled on one basic form of addressing. While there are subtle differences from computer system to computer system, most modern day addressing schemes share the concept of "virtual addressing." At the most fundamental level, virtual addressing allows most programs to operate without having to understand whether needed information is stored in main memory or in auxiliary storage. In other words, virtual addressing allows programs to locate and access needed information through a single virtual address, regardless of whether the information is actually stored in main memory or in auxiliary storage. When taken together, these virtual addresses are said to represent a virtual address space.

Multiple/Single Address Space(s)

While, as stated, the notion of a virtual address space is shared amongst most modern day computer systems, there are currently two very different approaches to the use of that space. Currently, the most popular approach is to split the virtual address space up into a series of logical address spaces that are each equal in size to the entire virtual address space. In this environment, each process is then given its own logical address space in which to operate. From the individual process' view, each process has use of the entire virtual address space of the computer system. This multiple address space approach is particularly beneficial in computer systems that have a relatively smaller virtual address space because addresses are reused by the programs running under the various processes. The problem with this approach, though, is that communicating (inter-address space communication) and/or moving information between the various address spaces (cross-address space mapping) requires a significant amount of overhead (i.e., because the addresses used to identify the information are not unique amongst the various processes).

Another approach, and that used in AS/400 computer systems, is referred to as single-level-store. The single-level-store approach involves the use of a single virtual address space that is represented by persistent virtual addresses. In this environment, the programs executing under the various processes do so in the same, single address space. The fact that one, large address space is used provides the opportunity make the virtual addresses persistent so that an address that is used to locate a particular piece of information remains the same no matter the frequency or elapsed time between accesses.

Detailed Design

Turning now to the drawings, FIG. 1 shows a block diagram of the computer system of the present invention. The computer system of the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 1, computer system 100 comprises main or central processing units (CPUs) 105 connected to main memory 140, terminal interface 145, mass storage interface 155, and network interface 160. These system components are interconnected through the use of system bus 150. Auxiliary storage interface 155 is used to connect mass storage devices (such as hard disk drives 182 and 185) to computer system 100.

CPUs 105 provide the parallelism necessary to support certain aspects of the present invention. These aspects will be explained in the forthcoming paragraphs. However, it is important to point out here that while computer system 100 of the preferred embodiment uses a four way central processing complex, those skilled in the art will appreciate that the benefits and advantages of the present invention are not limited by the type of multiprocessor environment or by the specific type or number of central processors used.

Computer system 100 utilizes well known virtual addressing mechanisms that allow the programs of computer system 100 to behave as if they have access to a large, single storage entity instead of access to multiple, smaller storage entities such as main memory 140 and hard disk drives 182 and 185. Therefore, while client process 178, database servers 172, and operating system 165 are shown to reside in main memory 140, those skilled in the art will recognize that these programs are not necessarily all completely contained in main memory 140 at the same time. (It should also be noted that the term "computer system memory" is used herein to generically refer to the entire virtual memory of computer system 100.)

Client process 178 is further shown to contain client program 176 and database manager 174. Client program 176 is a program that is a client of database administrator 170 in the sense that it makes use of database manager 170 to gain access to (and perform operations on) the information stored in database 187.

Database managers 174, which each execute within each process, are responsible for providing the "client-side" interface of database administrator 170. Database managers 174 are explained in greater detail in FIGS. 3, 4A, 4B, 4C, and 5. Database servers 172, which are utilized on an as needed basis with reference to the specific query at issue, are responsible for providing the interface between database administrator 170 and database 187. Database servers 172 are explained in greater detail in FIGS. 3 and 6.

Operating system 165 is a multitasking operating system known in the industry as OS/400; however, those skilled in the art will appreciate that the spirit and scope of the present invention is not limited to any one operating system.

The interfaces (called input/output processors in AS/400 terminology) of the preferred embodiment each include separate, fully programmed microprocessors that are used to off-load compute-intensive processing from CPUs 105. However, those skilled in the art will appreciate that the present invention applies equally to computer systems that simply use I/O adapters to perform similar functions.

Hard disk drives (HDD) 182 and 185 are IBM 9337 DASD devices; however, any hard disk devices could be used. HDD devices 182 and 185 are shown to contain database 187. Database 187 has been spread across these two HDD devices through a process called striping. The striping process, which is well known in the art, involves splitting database tables (sometimes called files) into a plurality of smaller storage aggregates. These smaller storage aggregates are then spread (when stored) onto several storage devices so as to facilitate parallelism during information retrieval. The importance of striping to the mechanisms of the present invention is explained in greater detail in the text associated with FIGS. 4A through 6. It should also be noted here that even though database 187 has been shown to wholly reside in HDDs 182 and 185, that some of the these smaller storage aggregates may at different times be located in main memory 140.

Terminal interface 145 is used to directly connect one or more terminals to computer system 100. These terminals, which may be non-intelligent or fully programmable workstations, are used to allow system administrators and users to communicate with computer system 100.

Network interface 160 is used to connect other computer systems and/or workstations to computer system 100 in networked fashion. The present invention applies equally no matter how computer system 100 may be connected to other computer systems and/or workstations and regardless of whether the connection(s) is made using present-day analog and/or digital techniques or via some networking mechanism of the future. It is also important to point out that the presence of network interface 160 within computer system 100 means that computer system 100 may engage in cooperative processing with one or more other computer systems or workstations. Of course, this in turn means that the programs shown in main memory 140 need not necessarily all reside on computer system 100.

It is important to note that while the present invention has been (and will continue to be) described in the context of a fully functional computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analogue communications links.

Figure 2:
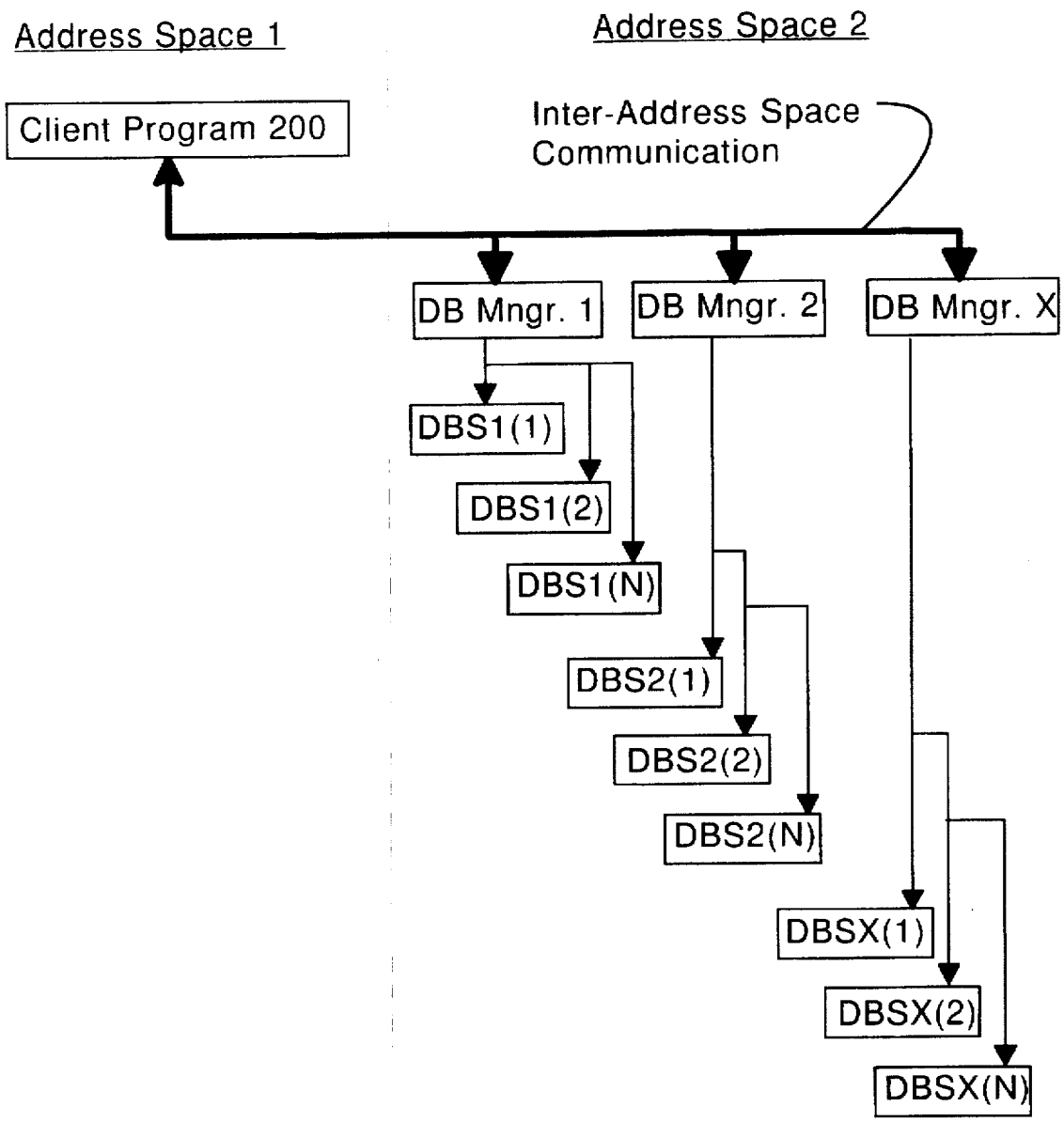
FIG. 2 is a block diagram showing the client program/database manager interaction of the prior art.

FIG. 2 shows the client program/database manager interaction that is known in the art. When client program 200 has cause to perform a query on certain database information, it sends an inter-process request to one of database managers 1 through X. Upon receipt of the request, a database manager will determine if it is possible to perform a parallel query. If so, the subject database manager will break the query apart and schedule several database servers (see, for example, database servers 1 through N of database manager 1) for execution on separate central processing units. Once each database server has completed its respective portion of the query, it will return its results to the responsible database manager. When all of the results have been returned, the database manager will return the results of the query to the requesting client.

As shown, client programs (e.g., client program 200) execute in a separate address space from that of the database manager. There are several problems with this approach. First, relaying the client program's initial request from address space 1 to address space 2 involves the overhead of inter-address space communication. Second, the fact that each database manager is a separate process (see database managers 1 through X) means that their total number is limited. Lastly, and most importantly, returning the information to the requesting client program is an expensive proposition because the results must some how be mapped back from address space 2 to address space 1.

Figure 3:
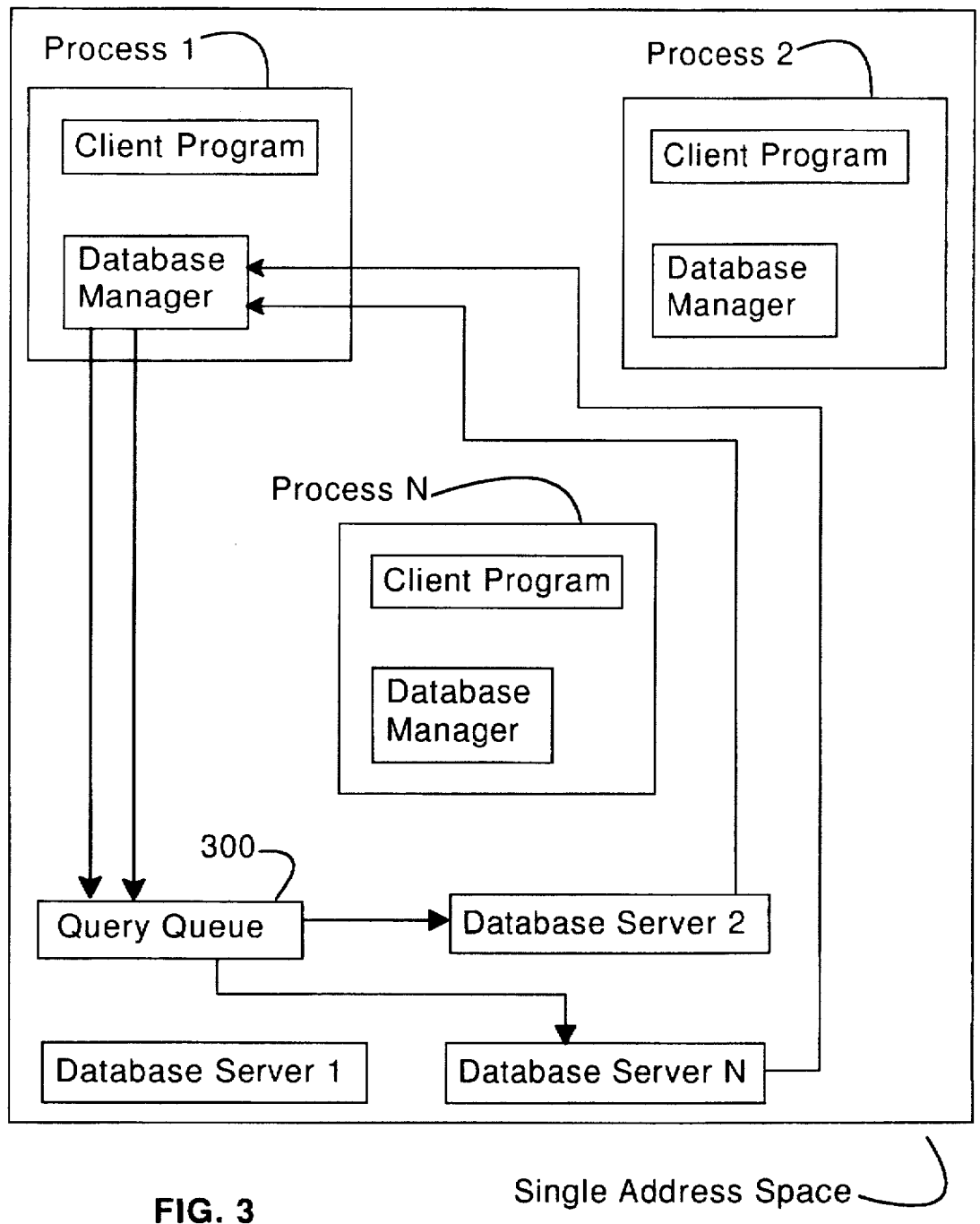
FIG. 3 is a block diagram showing the client program/database manager interaction of the preferred embodiment.

FIG. 3 shows the client program/database manager interaction of the preferred embodiment of the present invention. As shown, processes 1 through N operate together in a single address space, each having their own database manager (i.e., one of database managers 174). Each database manager is responsible for receiving its client program's queries, and for processing them in a parallel fashion whenever possible. Consider, for example, process 1 and assume for the purposes of explanation that the client program that is executing as part of process 1 initiates a query on a certain table of database 187. Assume further that the database manager of process 1 determines, upon receipt of the query from the client program, that the query involved is one that can be performed in a parallel manner. In this situation, the database manager breaks the query up into parts and creates a database server message for each part. The database manager will then place each message in query queue 300. Each message is then retrieved from query queue 300 by one of database servers 172. Each database server is then scheduled for execution on one of CPUs 105, where they each perform their respective part of the client program's query in parallel.

When a database server finishes its processing, it places the results of its portion of the query into a result buffer that is accessible by the database manager that issued the message (in this case the database manager of process 1). Depending upon the type of query involved, the issuing database manager will either return the results directly to the requesting client or wait for all of the results to be returned by the database servers and assemble the results into the form expected by the requesting client.

Each of these steps will be explained in greater detail in the text associated with FIGS. 4A through 6; however, at this point it is important to note that 1) no inter-address space communication is necessary to initiate a query because the database managers and database servers of the present invention both have direct access to query queue 300. 2) database managers are not limited in number because they are not architected as a separate process, and 3) expensive mapping of results from one address space to another is avoided by giving database servers and database managers direct access to result buffers.

Figure 4A:
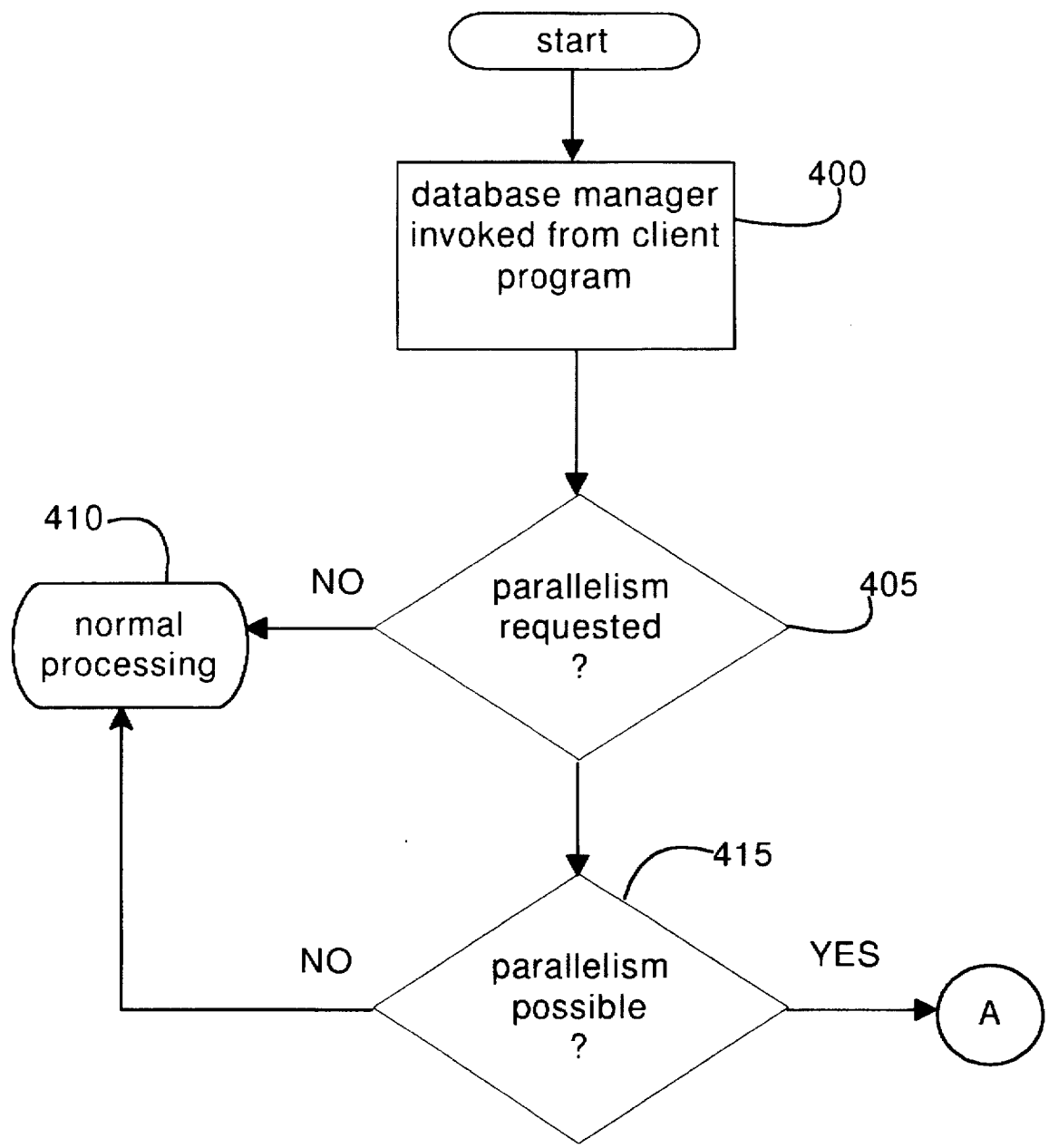
FIGS. 4A, 4B, and 4C show steps used to carry out the database manager of the preferred embodiment.
Figure 4B:
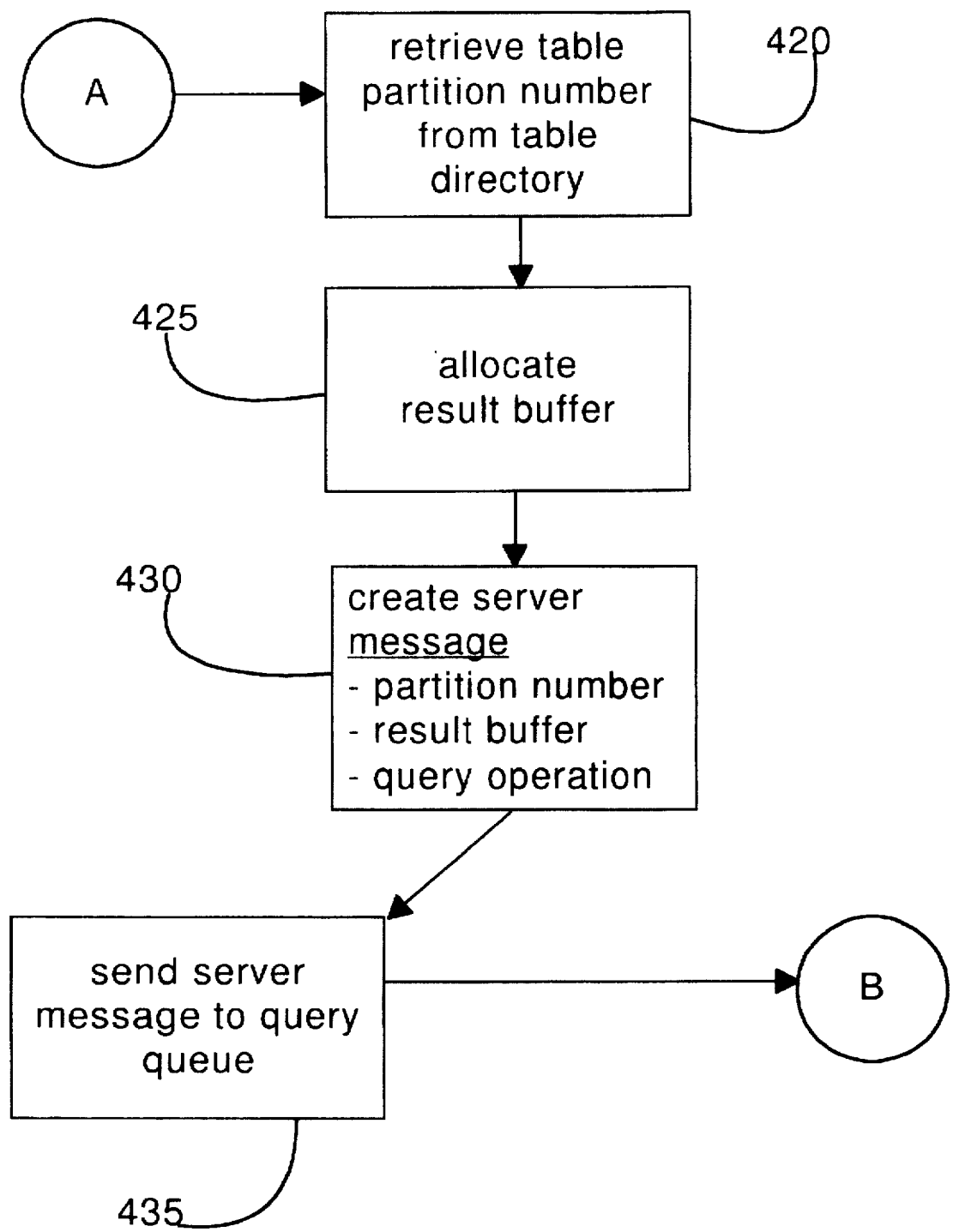
Figure 4C:
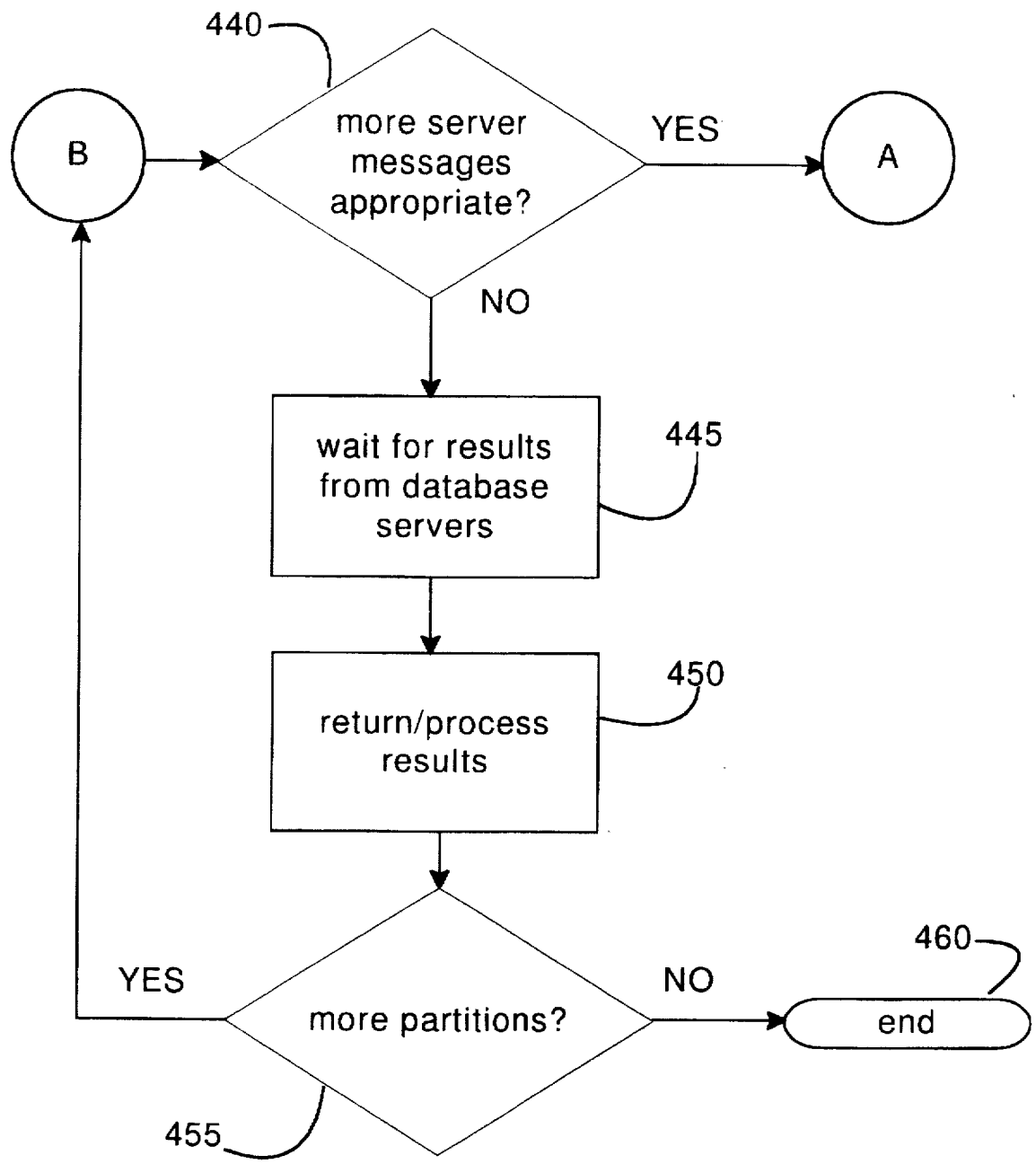

FIGS. 4A, 4B, and 4C show steps used to carry out the database manager of the preferred embodiment. Turning to FIG. 4A, a database manager is automatically invoked when a client program executes a database query command [block 400]. The database manager then determines whether the client program has requested that parallelism be used whenever possible [block 405]. In the preferred embodiment, the database manager discerns this information through reference to different items of configuration information, but those skilled in the art will appreciate that the specific means used is not important to the spirit or scope of the present invention. If parallelism is not requested, normal processing takes place [block 410]. However, if the client has requested parallelism, the database manager will next determine whether parallelism is possible [block 415]. The question of the possibility of parallelism is determined by the type of query involved. Parallelism is best applied to what we will term "partition-based queries."

Figure 5:
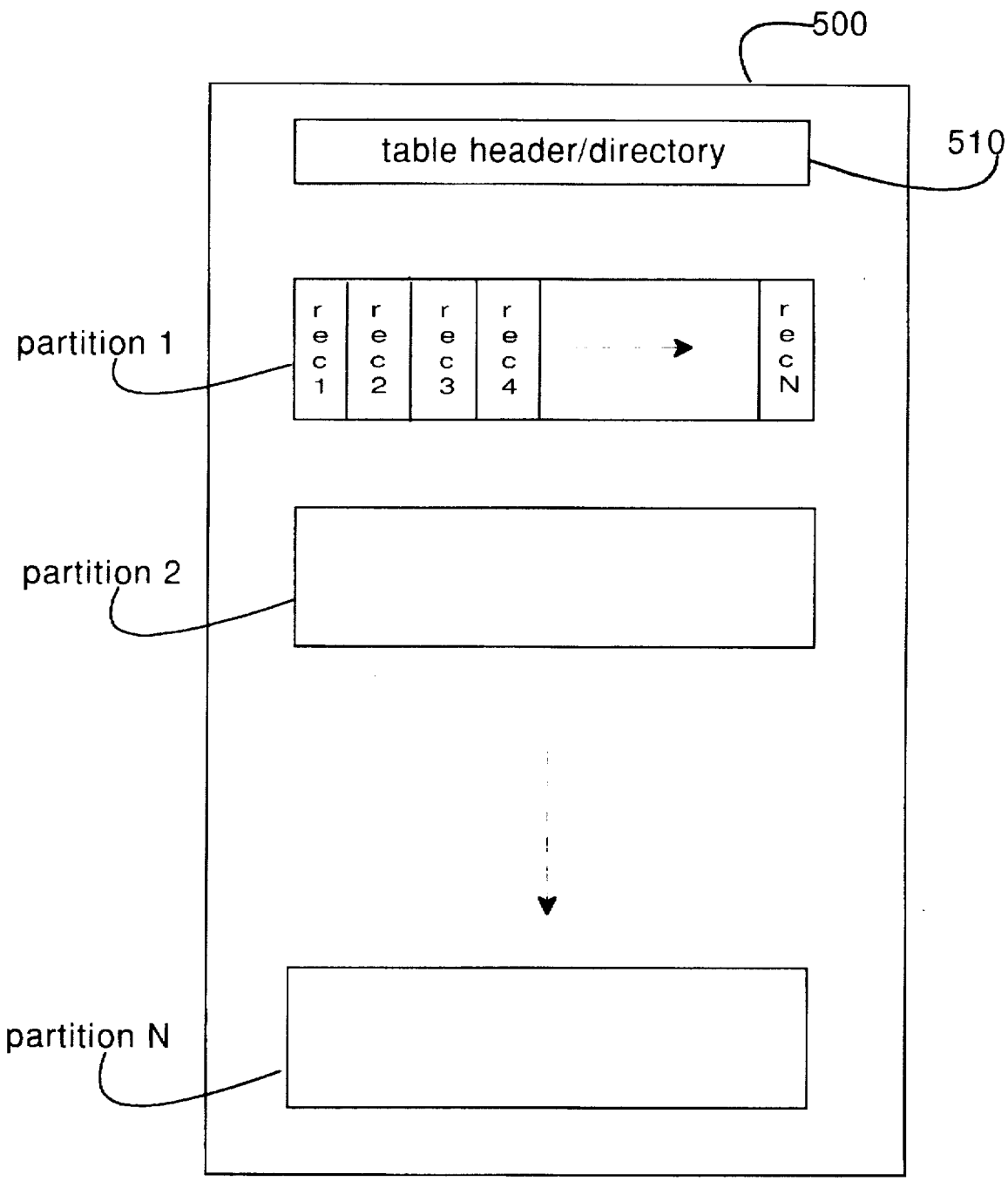
FIG. 5 shows the table format of the preferred embodiment.

Partitions are the logical storage aggregates that make up database tables. FIG. 5 shows the table structure used in the preferred embodiment. As shown, table 500 is made up of a table header/directory and a number of individual partitions (shown as partitions 1 through N). Each partition is then broken up into a series of records (e.g., see partition 1). As mentioned earlier, when a database table is stored, its partitions are spread across multiple storage devices through a process called striping, which was mentioned earlier. In the AS/400 computer system of the preferred embodiment, each table partition directly corresponds to what is referred to as a DASD extent. DASD extents are logical blocks that are used to organize information on DASD devices. (It is important to note here that those skilled in the art will appreciate that the notion of logically dividing HDD capacity into smaller storage aggregates is well known in the art and that the present invention merely depends upon the existence of such a logical division is present, not upon how the division takes place or upon the terminology used to describe the division.)

Using our terminology, then, a partition-based query is one that considers the entirety of two or more partitions. For example, some queries require what is referred to in the art as a "table scan." A table scan is used by a database manager when it is necessary to consider each and every partition in a table (i.e., to identify some subset of the records contained therein). If a query is not partition-based, the mechanisms of the present invention cannot take advantage of the striping that occurred when the database table at issue was stored.

If parallelism is not possible (i.e., if a partition-based query is not involved), the database manager of the present invention proceeds with normal processing [block 410].

However, if parallelism is possible, the database manager proceeds to retrieve a table partition number from the table directory (see table header/directory 510 of FIG. 5) [block 420 of FIG. 4B]. The database manager then allocates a result buffer for ultimate use by the database server [block 425] and creates a server message [block 430]. The server message includes: the persistent virtual address of the partition to be searched, the location of the previously allocated result buffer, and the query operation to be performed. Once the server message is created, it is placed in the query queue (see query queue 300 of FIG. 3) by the database manager [block 435].

The database manager then determines whether more database server messages are needed [block 440]. This inquiry involves a determination of the extent of parallelism that is appropriate for the specified query. In the preferred embodiment, the degree of parallelism can be specified by the client (i.e., via client configuration information) or it can be dynamically adjusted based on system resource availability and other factors. It should be noted, though, that the benefits and advantages of the present invention are not limited by the particular means used to determine the most appropriate degree of parallelism. In any case, the database manager will iterate though blocks 420 through 440 unit the correct number of database server messages (i.e., extent of parallelism) is achieved. Once the right number of database servers have been started, the database manager will wait for the database servers to start returning results [block 445]. As database servers return results, the database server will either return the results directly to the requesting client or store the results away until all the results have been returned [block 450]. As mentioned earlier, this decision is query dependent. After result processing, the database manager will determine if more partitions remain to be processed [block 445]. If so, the database manager will again determine how many database server message are appropriate (i.e., based on the degree of parallelism and the number of outstanding database server messages) [see the discussion of blocks 420–440]. If there are no more partitions to be processed, the database server will return to the requesting client in block 460.

Figure 6:
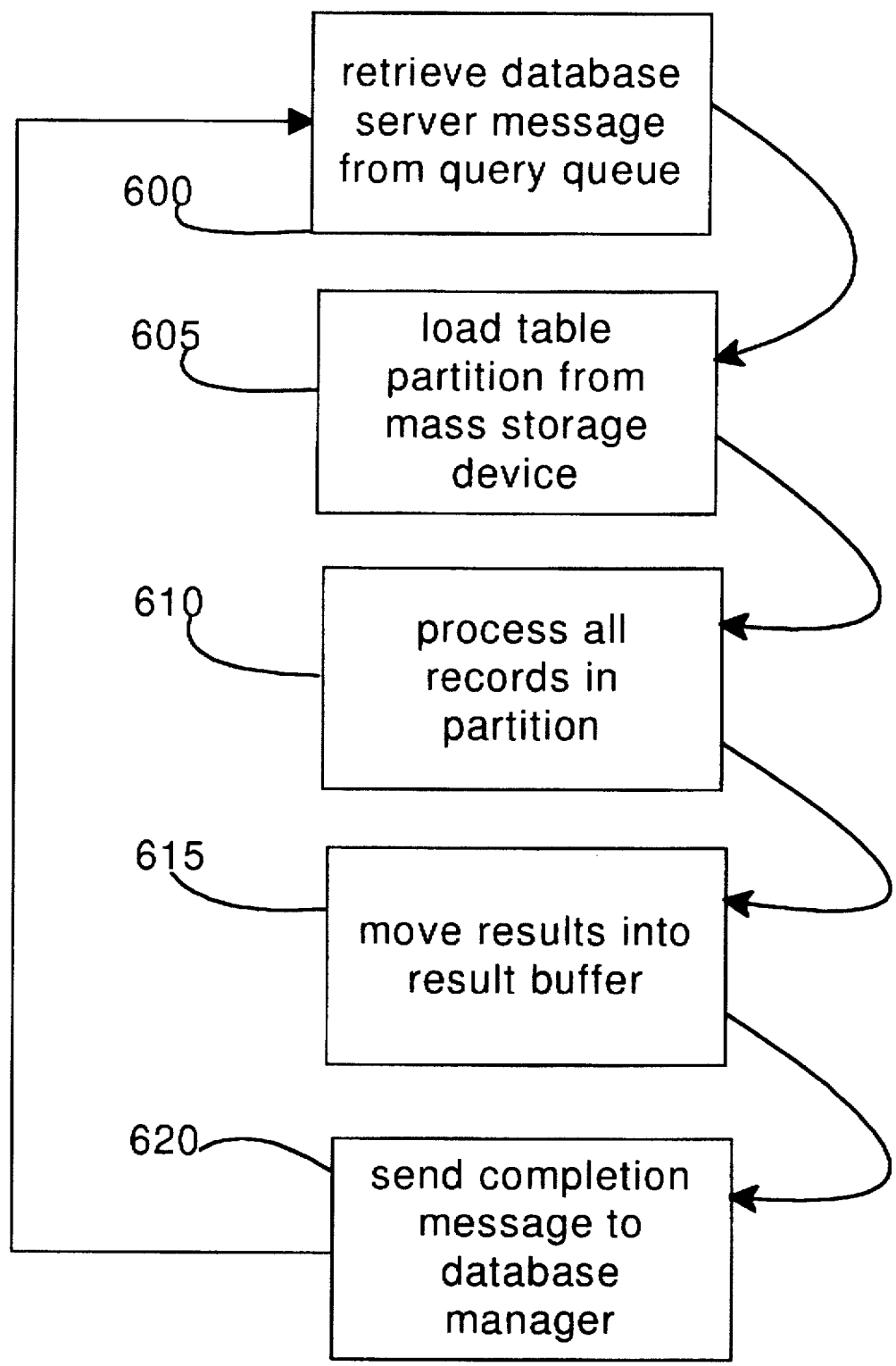
FIG. 6 shows steps used to carryout the database server of the preferred embodiment.

FIG. 6 is a flow diagram of steps used to carry out the database servers of the preferred embodiment. In block 600, one of database servers 172 retrieves a server message from query queue 300. The database server then proceeds to load the partition identified in the server message. (Note here that because of the single-level-store environment of the present invention, the database server can load the subject partition without considering whether the subject partition is actually located on one of HDD 182 and 185 or in main memory 140). Once loaded, the partition's records are all individually processed [block 610] and the results of that processing are placed directly into the result buffer that was previously allocated by the requesting database server [block 615]. When this is complete, the database server sends a completion message to the database manager [block 620] and returns to block 600 to check for another server message in query queue 300.

It is important to note here that the database server has split up the query (by partition) and placed two or more messages in query queue 300 so that more than one of database servers 172 can simultaneously work on the client's request. If we take the simple case where the appropriate degree of parallelism is two, one example would be the case where the striping process has placed one partition of the subject table on HDD 182 and another partition on HDD 185. In this case, two different database servers can execute simultaneously (i.e., on CPUs 105) to service the client's query. Another example is the case where one partition of the subject table was located on HDD 182 and another partition was located in main memory 140 (i.e., because previous activity had loaded the table into main memory 140), two different database servers can execute simultaneously (i.e., on CPUs 105) to service the client's query. A last example is the case where both partitions of the subject table are located in main memory 140 (i.e., because previous activity had loaded the table into main memory 140). Again, two different database servers can execute simultaneously (i.e., on CPUs 105) to service the client's query.

Advantages

The present invention provides an enhanced mechanism that permits client programs to make requests of database managers without having to incur the overhead of inter-address space communication.

The present invention provides an enhanced mechanism that provides client programs with access to the services of a database manager facility without limiting the actual number of database managers that are available to service the client program's request.

The present invention provides an enhanced mechanism that permits database managers to return query results to a requesting client programs without incurring the overhead of cross-address space mapping.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer system comprising:
   at least two central processing units;
   a bus;
   computer system memory connected to said central processing units via said bus, said computer system memory being represented by persistent virtual addresses;
   a database stored in said computer system memory, said database being comprised of a plurality of tables; and
   a database administrator, said database administrator being stored in said computer system memory, said database administrator being comprised of a plurality of database managers and a plurality of database servers, said database managers providing access to said database servers by client programs without said client programs incurring overhead from inter-address space communication between logical address spaces, said database servers providing access to said database by said database managers.

2. The computer system of claim 1 wherein said database servers are not limited in number.

3. The computer system of claim 1 wherein said database managers return query results to said client programs without incurring expense from cross-address space mapping.

4. A computer implemented method for accessing information in a database, said method comprising the steps of:

invoking a database manager from a plurality of database managers, said invoking step being performed by a client program via execution of a query, said database manager being made to execute under the same process as said client program such that said client program does not incur overhead from inter-address space communication between logical address spaces;

breaking said query into parts; and creating one database server message for each of said parts such that a plurality of server messages are created.

5. The method of claim 4 including the further step of sending each of said plurality of server messages to a database server.

6. The method of claim 5 including the further step of sending each of said plurality of server messages to a set of database servers, each of said database servers being capable of executing on a separate central processor.

7. The method of claim 6 including the step of returning results of said query to said client program without incurring expense from cross-address space mapping.

* * * * *